United States Patent
Masuda (10) Patent No.: US 7,619,795 B2
(45) Date of Patent: Nov. 17, 2009

(54) OPTICAL SCANNING DEVICE, OPTICAL SCANNING METHOD, AND IMAGE FORMING APPARATUS

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/327,335

(22) Filed: Dec. 3, 2008

(65) Prior Publication Data

US 2009/0153930 A1 Jun. 18, 2009

(30) Foreign Application Priority Data

Dec. 13, 2007 (JP) .............................. 2007-322588

(51) Int. Cl.
*G02B 26/08* (2006.01)
(52) U.S. Cl. .............. 359/196.1; 359/205.1; 359/212.1; 359/216.1; 359/900; 250/235
(58) Field of Classification Search ........................ None
See application file for complete search history.

(56) References Cited

U.S. PATENT DOCUMENTS

| | | | |
|---|---|---|---|
| 4,583,227 A * | 4/1986 | Kirkby ........................ 372/32 |
| 5,875,051 A | 2/1999 | Suzuki et al. |
| 6,069,724 A | 5/2000 | Hayashi et al. |
| 6,075,638 A | 6/2000 | Masuda |
| 6,081,386 A | 6/2000 | Hayashi et al. |
| 6,384,949 B1 | 5/2002 | Suzuki |
| 6,456,314 B1 | 9/2002 | Masuda |
| 6,462,879 B2 | 10/2002 | Masuda |
| 6,496,214 B1 | 12/2002 | Masuda et al. |
| 6,686,946 B2 | 2/2004 | Masuda et al. |
| 6,717,606 B2 | 4/2004 | Masuda |
| 6,724,414 B2 | 4/2004 | Masuda et al. |
| 7,068,295 B2 | 6/2006 | Masuda |
| 7,436,563 B2 | 10/2008 | Miyamoto |
| 2004/0213131 A1 * | 10/2004 | Kimura et al. ......... 369/112.03 |
| 2005/0067944 A1 | 3/2005 | Masuda et al. |
| 2005/0093963 A1 | 5/2005 | Masuda |
| 2006/0256183 A1 | 11/2006 | Masuda |
| 2007/0146473 A1 | 6/2007 | Masuda |
| 2008/0084594 A1 | 4/2008 | Masuda |
| 2009/0009838 A1 | 1/2009 | Masuda |

FOREIGN PATENT DOCUMENTS

JP 2007-133385 5/2007
JP 2007-199666 8/2007

* cited by examiner

*Primary Examiner*—James Phan
(74) *Attorney, Agent, or Firm*—Dickstein Shapiro LLP (57) ABSTRACT

An optical scanning device includes a laser light source that emits a laser beam; a light deflector that deflects the laser beam; a scan-imaging optical system that focuses the laser beam deflected from the light deflector on a scanning surface to optically scan the scanning surface; a diffractive optical element receives the laser beam and diffracts a portion of the laser beam as a diffracted light; and a detecting unit that detects the diffracted light. The laser light source is a surface-emitting laser light source. Moreover, the diffractive optical element is made of plastic material having a linear expansion coefficient within a temperature variation range of the optical scanning device nearly equal to a rate of wavelength change of an emission wavelength of the laser light source within the temperature variation range.

8 Claims, 5 Drawing Sheets

SUB-SCANNING
DIRECTION

MAIN SCANNING
DIRECTION

OPTICAL SCANNING DEVICE, OPTICAL SCANNING METHOD, AND IMAGE FORMING APPARATUS

CROSS-REFERENCE TO RELATED APPLICATIONS

The present application claims priority to and incorporates by reference the entire contents of Japanese priority document 2007-322588 filed in Japan on Dec. 13, 2007.

BACKGROUND OF THE INVENTION

1. Field of the Invention

The present invention relates to an optical scanning device, an optical scanning method, and an image forming apparatus.

2. Description of the Related Art

An optical scanning device and an optical scanning method are widely used in existing image forming apparatuses such as digital copiers, printers, and digital multi function peripherals (MFP). A typical optical scanning device and an optical scanning method cause a light deflector to deflect a laser beam from a laser light source, form a beam spot on a scanning surface, i.e., a surface to be scanned, by using a scanning-image-forming optical system, and carry out optical scanning.

An edge-emitting semiconductor laser (edge-emitting laser light source) has been predominantly used as a laser light source in the existing optical scanning devices. However, in recent years, a surface-emitting laser light source (or a vertical cavity surface emitting laser (VCSEL)) is used in place of the edge-emitting semiconductor laser. As compared to the edge-emitting laser light source, array arrangement of light-emitting portions is easy in the surface-emitting laser light source. In the existing edge-emitting semiconductor laser arrays, an array sequence of four to eight light-emitting elements can only be arranged. However, if the surface-emitting laser light source is used, an array sequence of 16 to 32 or even more light emitting portions can be arranged. In other words, the surface-emitting laser light source is highly anticipated as a light source of a multi-beam optical scanning device.

A diffractive optical element is generally used in optical scanning devices. For example, in the existing optical scanning devices, laser beam that is deflected by the light deflector is detected outside of an effective scanning area on an optical scanning start side and the result of the detection is used for synchronization control for starting optical writing. Moreover, a technique has been proposed in which the laser beam is separated into two light beams of a zero-order light and a first-order diffracted light by using the diffractive optical element, one of the light beams is detected and the result of the detection is used to perform the synchronization control for starting optical writing while the other is used to detect a scan line position in a sub-scanning direction.

Thus, a diffractive optical element is used as an optical element in the existing optical scanning device. For example, an optical scanning device that includes the surface-emitting laser light source and the diffractive optical element is disclosed in Japanese Patent Application Laid-open Nos. 2007-133385 and 2007-199666.

The optical scanning device includes members or units such as a polygon mirror, which is used as the light deflector, and a semiconductor laser light source that produce heat when in use. Although the temperature (inside temperature) of the optical scanning device varies according to the season, the temperature generally fluctuates within a range of 30 degrees. It is also well-known that a luminescence wavelength of the laser light source, which is used as the light source, also varies according to temperature variation. The same phenomenon can also occur in the surface-emitting laser light source.

Various optical elements that are used in the optical scanning device are designed such that those optical elements perform desired optical functions at a standard temperature. This standard temperature is set for each optical scanning device according to the design of the optical scanning device and it is generally around 25° C.

A diffraction angle, by which the diffractive optical element diffracts an incident light, changes when a grating pitch of a diffraction grating changes. Furthermore, the diffraction angle also changes when a wavelength of a diffracted light changes.

If the diffractive optical element is made of plastic material, the grating pitch of the diffraction grating changes due to thermal deformation of the diffractive optical element that occurs due to fluctuation in the temperature of the optical scanning device. Due to this, the diffraction angle of the diffracted light also changes and is likely to stray from a light detector that detects the diffracted light. One approach to this problem could be, as disclosed in Japanese Patent Application Laid-open No. 2007-199666, to make the diffractive optical element with an optical glass having extremely insignificant thermal deformation. However, even if the diffraction grating having insignificant heat deformation is used, changes in the diffraction angle that occur due to variation in the luminescence wavelength of the light source are not avoided.

In the above-mentioned conventional technologies, measures have not been taken with respect to changes in the diffraction angle that occur due to thermal deformation of the diffraction grating itself and changes in the diffraction angle that occur due to changes in the waveform.

SUMMARY OF THE INVENTION

It is an object of the present invention to at least partially solve the problems in the conventional technology.

According to an aspect of the present invention, there is provided an optical scanning device including a laser light source that emits a laser beam; a light deflector that deflects the laser beam; a scan-imaging optical system that focuses the laser beam deflected from the light deflector on a scanning surface to optically scan the scanning surface; a diffractive optical element receives the laser beam and diffracts a portion of the laser beam as a diffracted light; and a detecting unit that detects the diffracted light. The laser light source is a surface-emitting laser light source. The diffractive optical element is made of plastic material having a linear expansion coefficient within a temperature variation range of the optical scanning device nearly equal to a rate of wavelength change of an emission wavelength of the laser light source within the temperature variation range.

According to another aspect of the present invention, there is provided a method of optical scanning that employs the above optical scanning device to optically scan a scanning surface.

According to still another aspect of the present invention, there is provided an image forming apparatus that includes the above optical scanning device.

The above and other objects, features, advantages and technical and industrial significance of this invention will be better understood by reading the following detailed descrip-

DETAILED DESCRIPTION OF THE PREFERRED EMBODIMENTS

Exemplary embodiments according to the present invention are explained below with reference to the accompanying drawings.

The optical scanning device uses a surface-emitting laser light source (vertical cavity surface emitting laser (VCSEL)) as the laser light source and includes a diffractive optical element and a light-detector for diffracted-light detection.

The diffractive optical element diffracts a portion of the laser beam that is irradiated from the surface-emitting laser light source. In doing so, the diffractive optical element does not diffract the entire laser beam that is incident on the diffractive optical element. In other words, some portion of the laser beam is transmitted through the diffractive optical element as a zero-order light without being diffracted and another portion of the laser beam is diffracted.

The light-detector for diffracted-light detection detects the diffracted light that is diffracted by the diffractive optical element. Various types of known photo detectors can be used as the light-detector for diffracted-light detection.

The diffractive optical element is made of plastic material. The plastic material having a linear expansion coefficient α within the temperature variation range of the optical scanning device nearly equal to a rate of wavelength change β of a luminescence wavelength of the surface-emitting laser light source is selected for the diffractive optical element. The temperature variation range of the optical scanning device is a temperature range within which the temperature inside the optical scanning device can deviate from a standard temperature (for example, 25° C.), and it is about 30° C.

A first-order diffracted light is formed of a plus-first-order diffracted light and a minus-first-order diffracted light. When the angle of incidence of the laser beam on the diffractive optical element is zero, from those two first-order diffracted lights, the one for which the layout of the light-detector for diffracted-light detection is simple can be detected. When the incidence angle is not zero, the diffraction angle differs in the plus-first-order diffracted light and the minus-first-order diffracted light. Therefore, when the incidence angle is not zero, generally detecting the minus-first-order diffracted light is desirable.

An image forming apparatus according to the present invention uses the optical scanning device according to the present invention. To be specific, the image forming apparatus can be realized as digital copiers, various types of printers, and digital multi function peripherals (MFP). Generally, the optical scanning device is embedded inside the image forming apparatus, so that the temperature variation range of the optical scanning device that is embedded inside the image forming apparatus is the temperature variation range of the optical scanning device.

The principles of the present invention are explained with reference to FIGS. 1A and 1B.

The diffractive optical element 1 according to an embodiment is explained with reference to FIG. 1A. In the diffractive optical element 1, a surface-relief-type diffraction grating 1A is formed on one side of a transparent parallel plate. As shown in FIG. 1A, the shape of the diffraction grating 1A appears like a rectangular waveform in cross section, and for a grating pitch P and a line width L, a fill factor F is calculated as F=L/P=0.5.

Figure 1A:
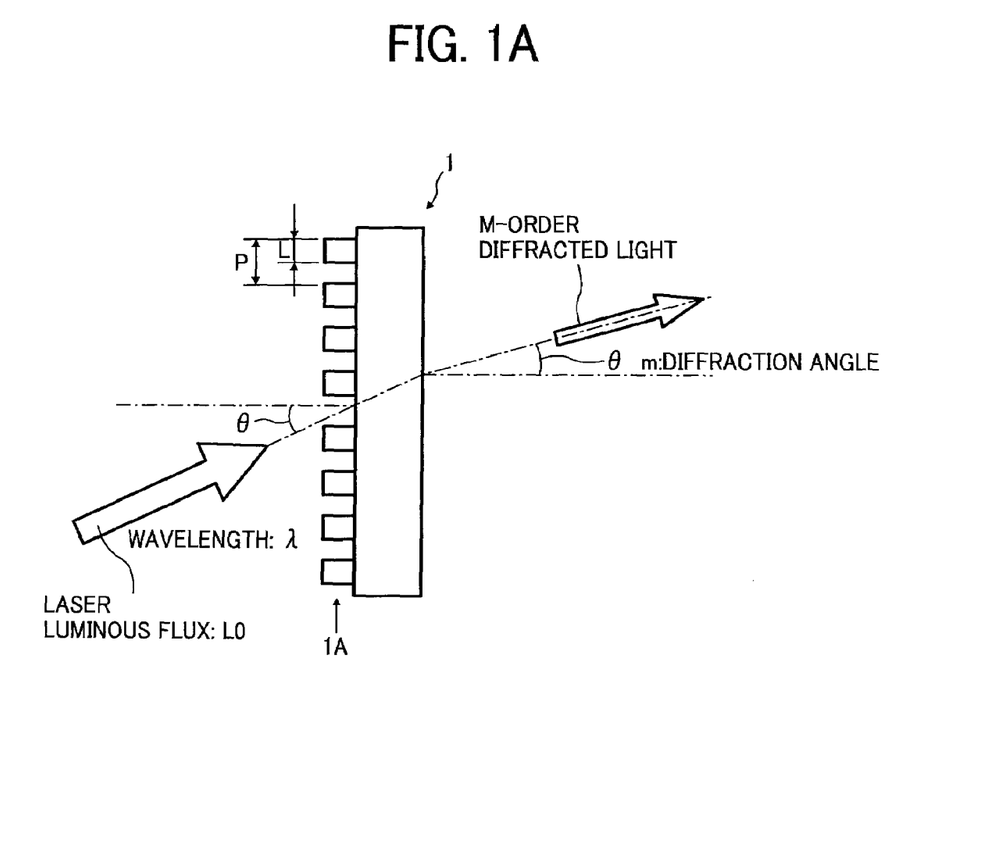
FIGS. 1A and 1B are schematic diagrams for explaining a diffractive optical element and a surface-emitting laser light source.
Figure 1B:
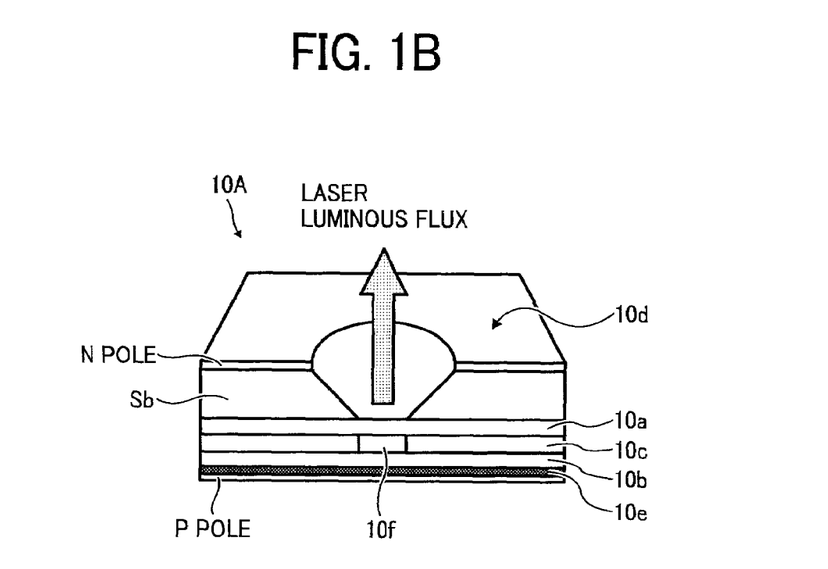

As shown in FIG. 1A, when a laser beam L0 having a wavelength λ enters the diffractive optical element 1 at an incident angle θ, a diffraction angle θm of an m-order diffracted light can be calculated by a known diffraction formula given below as Expression (1):

$$\sin\theta + m\lambda/P = \sin\theta m \quad (1)$$

Thus, it can be surmised from Expression (1) that the diffraction angle θm depends on the parameter λ/P.

In the optical scanning device or the image forming apparatus using the optical scanning device, an operating environment temperature range becomes known during designing. When deploying the diffractive optical element 1 in the optical scanning device, it is necessary to guarantee that the characteristics of the diffractive optical element 1 are preserved within the operating environment temperature range.

The operating environment temperature range corresponds to the temperature variation range of the optical scanning device that is explained earlier.

If the temperature of the optical scanning device changes, the wavelength λ of the laser beam as well as the grating pitch P of the diffraction grating 1A in the diffractive optical element 1 change, and therefore the diffraction angle θm also changes. As a result, the direction of the diffracted light towards a light detecting element that detects diffracted light changes. As a result, an incidence position of the diffracted light on the light detecting element changes, thus causing degradation of detection accuracy.

The inventor of the present invention has measured the change in the diffraction angle θm by throwing a laser beam of constant wavelength towards the diffractive optical element 1 at the incident angle θ and only changing the temperature of the diffractive optical element 1. The result matches with a calculation result obtained when the grating pitch P expands/contracts due to the linear expansion coefficient of the material of the diffractive optical element 1.

In other words, the experiment ascertains Expression (2) given below, where P [μm] is the grating pitch of the diffractive optical element 1 at a standard temperature (usually, 25° C.), α [1/° C.] is the linear expansion coefficient of the material of the diffractive optical element 1, ΔT [° C.] is a temperature change in the diffractive optical element 1 from the standard temperature, and P' [μm] is the grating pitch at the temperature change ΔT.

$$P' = P(1 + \alpha \Delta T) \quad (2)$$

The surface-emitting laser light source 10A that is used as the laser light source is explained below. FIG. 1B is a drawing of an example of the surface-emitting laser light source. The surface-emitting laser light source 10A includes a single light emitting unit. An active layer 10c is sandwiched between cladding layers 10a and 10b. A reflecting surface 10d having a high reflectance is formed on the cladding layer 10a. A reflecting surface 10e having a high reflectance is formed on the cladding layer 10b. The region sandwiched between the reflecting surfaces 10d and 10e functions a Fabry-Perot resonator that is perpendicular to a substrate Sb. Laser oscillation occurs in an oscillation area 10f inside the active layer 10c and the laser beam is emitted perpendicular to the substrate Sb (upward direction in FIG. 2).

Alternatively, the light source can be a surface-emitting laser array having a plurality of light emitting units arranged in an array and that emits a plurality of laser beams or a plurality of surface-emitting laser light sources each having a single light source arranged in an array.

When the temperature change $\Delta T$ from the standard temperature is 100° C. or so, the relation between the wavelength $\lambda$ [μm] of the laser beam of the surface-emitting laser light source at the standard temperature, a wavelength change $\Delta\lambda$ [m/° C.] at the temperature change $\Delta T$ [° C.], and an altered wavelength $\lambda'$ [μm] can be expressed by Expression (3):

$$\lambda' = \lambda + \Delta\lambda \cdot \Delta T \quad (3)$$
$$= \lambda(1 + \Delta\lambda \cdot \Delta T/\lambda)$$
$$= \lambda(1 + \beta\Delta T)$$

In the above expression, "$\beta=\Delta\lambda/\lambda$ [1/° C.]" denotes a rate of wavelength change (wavelength change per unit wavelength).

Thus, because the unit 1/° C. is the same, the magnitude of the linear expansion coefficient $\alpha$ of the material of the diffractive optical element 1 and the rate of wavelength change $\beta$ of the surface-emitting laser light source can be mutually compared.

The diffraction formula, i.e., Expression (1), can also be established for the altered wavelength $\lambda'$, an altered grating pitch P', and an altered diffraction angle $\theta'$, as Expression (4):

$$\sin\theta + m\lambda'/P' = \sin\theta m' \quad (4)$$

Expression (5) is obtained by substituting $\lambda'$ and P' of Expression (4) with the right-hand part of Expressions (2) and (3), respectively:

$$\sin\theta + m\lambda(1+\beta\Delta T)/P(1+\alpha\Delta T) = \sin\theta m' \quad (5)$$

If the second term on the left-hand side of Expression (5) is substituted with Expression (6):

$$y = (1+\beta\Delta T)/(1+\beta\alpha T) \quad (6)$$

then Expression (5) would become $$\sin\theta + m\gamma\lambda/P = \sin\theta m' \quad (7)$$

If $\gamma=1$, then the left-hand part of Expression (7) and the left-hand part of Expression (1) are identical. Thus, when $\gamma=1$, the diffraction angle before and after alteration become $\theta m'$ (or $\theta m$). That is, irrespective of the temperature change $\Delta T$, the diffraction angle $\theta m$ of the m-order diffracted light does not change.

Because $\gamma=1$ is equivalent to $\alpha=\beta$, if a material having a linear expansion coefficient $\alpha$ that is equal to the rate of wavelength change $\beta$ of the surface-emitting laser light source is selected for the diffractive optical element 1, the diffraction angle $\theta m$ is not affected by the temperature change $\Delta T$ irrespective of a diffraction order m of the diffracted light.

Thus, even if $\alpha$ is not exactly equal to $\beta$, in other words, $\alpha$ is nearly equal to $\beta$, the variation in the diffraction angle due to temperature fluctuation can be adequately reduced.

It can be learned from the experiment that when the emission wavelength $\lambda$ is in the range of 780 nanometers (nm) to 850 nm, the wavelength change $\Delta\lambda$ of the surface-emitting laser light source is an insignificant 0.05 nm/° C. (for the emission wavelength of 850 nm) to 0.06 nm/° C. (for the emission wavelength of 780 nm) in the temperature range of within ±5° C. of the standard temperature. Therefore, the rate of wavelength change $\beta$ can be calculated by $$\beta = 5.9 \times 10^{-5} \text{ to } 7.7 \times 10^{-5} \quad (8)$$

The linear expansion coefficient $\alpha$ of common optical materials, for example, optical glass such as fused silica and Bk7, and plastic such as polycarbonate, is $5\times10^{-7}$ (fused silica), $7-8\times10^{-6}$ (optical glass), and $6-7\times10^{-5}$ (plastic). It is evident from these values that the range of the linear expansion coefficient $\alpha$ of the plastic is substantially equal to the range of the rate of wavelength change $\beta$ of a surface-emitting laser. Thus, selecting plastic material for manufacturing the diffractive optical element effectively reduces, or entirely eliminates, the impact of temperature variation on the diffraction angle.

In the edge-emitting laser light source, the wavelength change $\Delta\lambda$ is 0.2 nm/° C. (for emission wavelength $\lambda=780$ nm) and the rate of wavelength change $\beta$ would be $2.6\times10^{-4}$. Consequently, the order of the linear expansion coefficient for all the three materials mentioned above will be different. Thus, no matter what material is selected, the impact of temperature change on the diffraction angle cannot be reduced.

As mentioned earlier, if $\gamma=1$, in other words, if $\alpha=\beta$, irrespective of the diffraction order m, the diffraction angle $\theta m$ is not affected by temperature variation. However, if $\alpha$ is nearly equal to $\beta$, in other words, the values of $\alpha$ and $\beta$ are not the same, the impact of temperature variation on the diffraction angle varies according to the diffraction order m.

Expression (9) is obtained by subtracting Expression (1) from Expression (7):

$$m(\gamma-1)\lambda/P = \sin\theta m' - \sin\theta m \quad (9)$$

$\gamma$ in Expression (6) depends on the characteristics of the surface-emitting laser light source and the material of the diffractive optical element. In such a case, the diffraction angle $\theta m$, in other words, a right-hand part of Expression (9) changes proportionally with the diffraction order m. Thus, when $\gamma$ is not equal to 1, in other words, when $\alpha$ is nearly equal to $\beta$, the change of the diffraction angle due to temperature variation reduces in direct proportion to the reduction in the diffraction order m. Thus, it is preferable that the diffracted light detected by the light-detector for diffracted-light detection is a plus-minus first-order diffracted light diffracted by the diffractive optical element. This increases the degree of freedom for selecting the material for the diffractive optical element or for selecting the surface-emitting laser light source for the diffractive optical element.

The calculations mentioned earlier are explained below by using specific values.

In the diffractive optical element 1 shown in FIG. 1A, the diffraction grating 1A is assumed to be surface-relief-type and having a periodic structure with P=0.75 μm, L=0.3 μm, in other words, F=0.4. The emission wavelength $\lambda$ of the laser beam emitted by the surface-emitting laser light source is 0.78 μm at the standard temperature, and its incidence angle $\theta$ is 45 degrees. Under these conditions, the diffraction angle $\theta_{-1}$ of the minus-first-order diffracted light would be −19.444 degrees.

Assuming that the temperature change $\Delta T$ relative to the standard temperature in the operating environment temperature range in the optical scanning device is 30° C., and the linear expansion coefficient $\alpha$ of the plastic material from which the diffractive optical element 1 is made of is $7\times10^{-5}$ [1/° C.], the altered grating pitch P', i.e., grating pitch that has undergone the temperature change $\Delta T$ of 30° C., would be 0.75158 μm.

If the wavelength change $\Delta\lambda$ of the surface-emitting laser light source is 0.055 nm/° C., the altered emission wavelength $\lambda'$ of the surface-emitting laser light source, i.e., emission wavelength that has undergone the temperature change $\Delta T$ of 30° C., changes to 0.78165 μm.

Thus, the altered diffraction angle $\theta_{-1}'$ of the minus-first-order diffracted light at the temperature change $\Delta T$ of 30° C. would be −19.445 degrees. In other words, there is practically no change in the diffraction angle due to temperature variation (i.e., $\theta_{-1}$ is nearly equal to $\theta_{-1}'$). The rate of wavelength change $\beta$ under this condition would be $\Delta\lambda/\lambda=7.05\times10^{-5}$ [1/° C.], thus satisfying the condition of $\alpha$ and $\beta$ being nearly equal.

As a comparative example, a laser beam having the wavelength $\lambda$ of 0.78 μm emitted from the edge-emitting laser light source (laser diode (LD)) is envisaged as being incident on the diffractive optical element of fused silica material and having the surface-relief-type diffraction grating of a rectangular waveform shape.

Using the linear expansion coefficient $\alpha$ of the fused silica, which is $5\times10^{-7}$ 1/° C., and the wavelength change $\Delta\lambda$ of the edge-emitting laser light source, which is 0.2 nm/° C., the grating pitch P' at the temperature change $\Delta T$ of 30° C. would be 0.7500 μm, the altered wavelength $\lambda'$ at the temperature change $\Delta T$ of 30° C. would be 0.786 μm, and the altered diffraction angle $\theta_{-1}'$ of the first-order diffracted light would be −19.930 degrees, altered by 0.486 degrees relative to the diffraction angle $\theta_{-1}$ at the standard temperature.

Diffractive optical elements are broadly classified into amplitude-type diffractive optical elements and phase-type diffractive optical elements. Phase-type diffractive optical elements are further classified into refractive-index modulation type diffractive optical elements and surface-relief-type diffractive optical elements. Any of those diffractive optical elements can be used in the embodiments. When an amplitude-type diffractive optical element is made of plastic material, it is necessary to apply a light-shielding mask on the plastic surface for forming a shading layer. When a refractive-index modulation type diffractive optical element is made of plastic material, it is necessary to change the grating pitch while maintaining a degree of refractive-index modulation. However, in the case of the surface-relief-type diffraction grating, the diffraction grating shape can be directly formed on the surface of the plastic material. Thus, problems associated with maintaining different materials or phase distribution can be avoided. In addition, the diffraction grating shape can be transferred to the plastic surface using a method called nano-imprinting method by which shape transfer is carried out efficiently and cost-effectively.

The permissible range diffraction angle change is narrow or broad according to the actual configuration (purpose or operating conditions of the diffractive optical) of the optical scanning device. However, it is preferable that the difference between $\alpha$ and $\beta$ be less than $0.3\times10^{-5}$ (1/° C.) to realize the commonly used permissible range.

Figure 2:
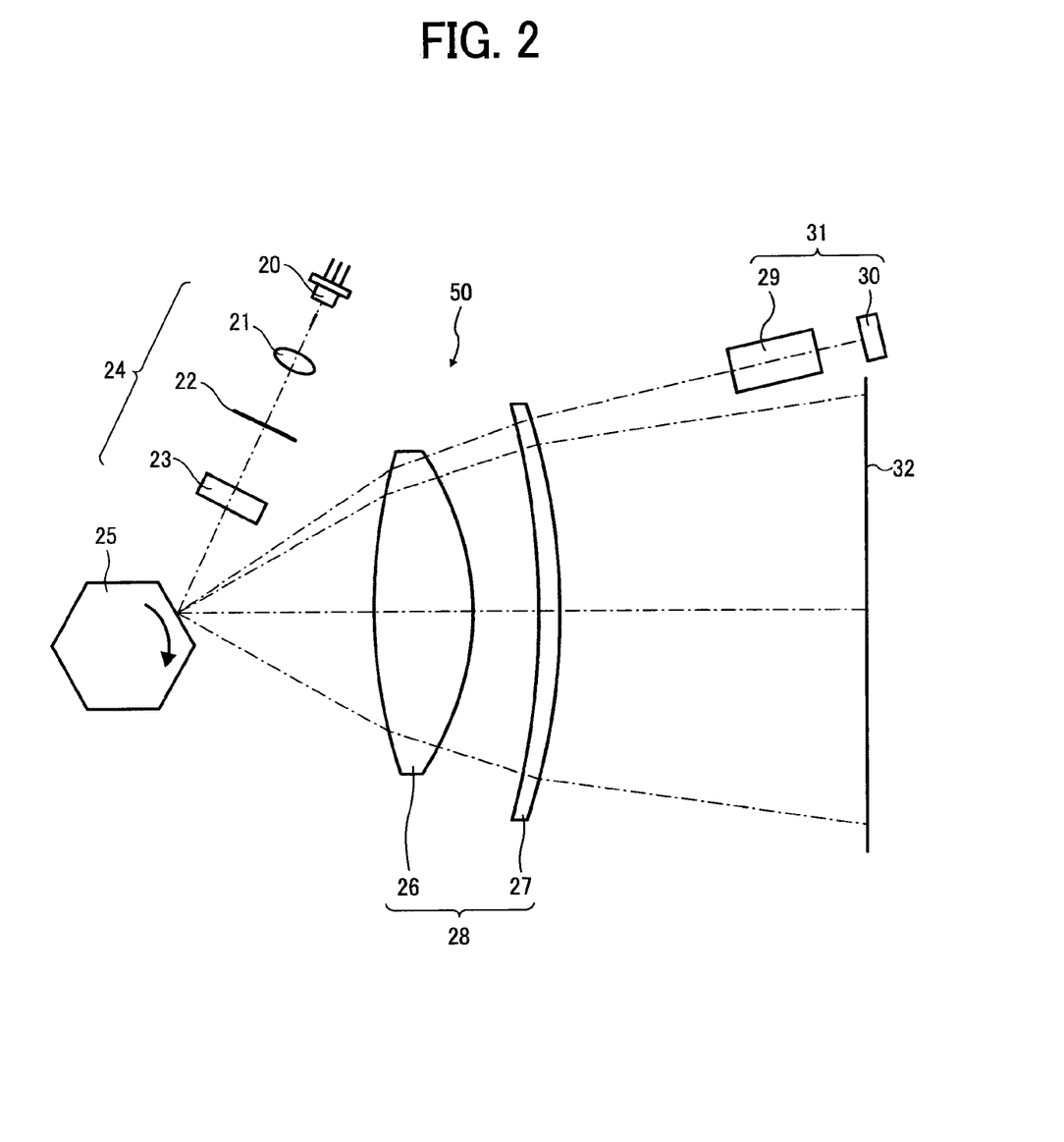
FIG. 2 is a top view of an optical scanning device according to an embodiment of the present invention.

FIG. 2 is a top view of an optical scanning device 50 according to an embodiment of the present invention.

The optical scanning device 50 includes a surface-emitting laser light source 20, a shaping optical system 24, a light deflector 25, a scan-imaging optical system 28, and a light beam detector 31. The shaping optical system 24 includes a coupling lens 21, an aperture member 22, and a cylindrical lens 23. The scan-imaging optical system 28 includes two lenses 26 and 27. The light beam detector 31 includes a splitting optical system 29 and a light detector 30. The optical scanning device 50 also includes a processor (not shown). The light deflector 25 is a polygon mirror.

The surface-emitting laser light source 20 can be a single beam light source or a multi-beam light source in the form of a surface-emitting laser array (vertical cavity surface emitting laser (VCSEL) array).

In the present embodiment, the coupling lens 21 is configured to shape a laser beam emitted by the surface-emitting laser light source 20 into a substantially parallel beam. Alternatively, the coupling lens 21 can be configured to shape the laser beam into a mildly divergent beam or a mildly convergent beam.

The laser beam shaped by the coupling lens 21 then passes through the aperture member 22, which blocks a portion of the laser beam. The cylindrical lens 23 converges the laser beam emerging from the aperture member 22 in a sub-scanning direction. The laser beam is converged in a vicinity of a reflective surface of the light deflector 25 as an elongated line image in a main scanning direction.

The light deflector 25, which is driven to rotate, deflects the laser beam. The scan-imaging optical system 28, which includes the two lenses 26 and 27, forms a beam spot on a scanning surface 32. The beam spot optically scans the scanning surface 32 as the light deflector 25 rotates.

The portion of the laser beam emerging from the scan-imaging optical system 28 that falls outside an effective scanning area in the main scanning direction enters the light beam detector 31 and is used by the light beam detector 31 for detecting a light beam position.

Apart from performing synchronous detection, which involves detecting a main-scanning light beam position and adjusting a write start timing, the light beam detector 31 detects a sub-scanning scan line position by detecting the light beam position in the sub-scanning direction.

Figure 3A:
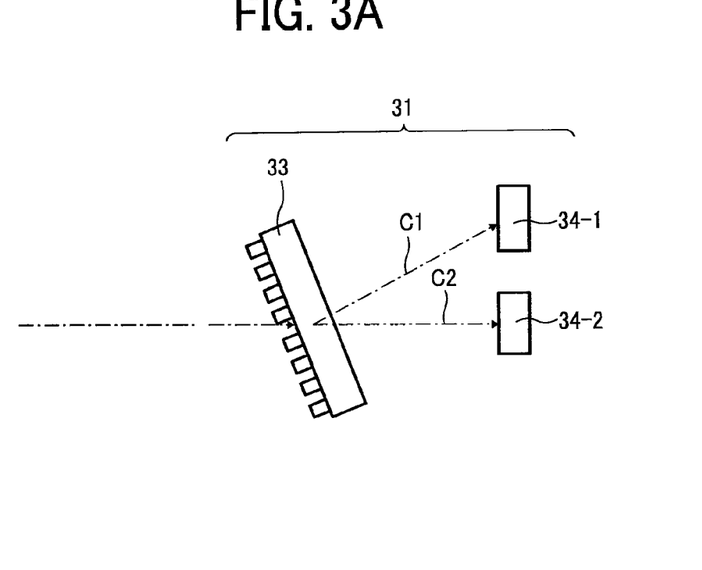
FIGS. 3A and 3B are schematic diagrams for explaining detection of a light beam according to the embodiment.

FIG. 3A is a schematic diagram for explaining a structure of the light beam detector 31. The portion of the laser beam emerging from the scan-imaging optical system 28 that falls outside the effective scanning area in the main scanning direction enters a diffractive optical element 33 and gets split into two light beams C1 and C2 in the sub-scanning direction (vertical direction in FIGS. 3A and 3B). The diffractive optical element 33 is made of plastic and includes a surface-relief-type diffraction grating.

The light beam C1 is a minus-first-order diffracted light and the light beam C2 is an undiffracted zero-order transmitted light. Two light detectors 34-1 and 34-2 that are arranged apart from each other in the sub-scanning direction respectively detect the light beams C1 and C2.

Figure 3B:
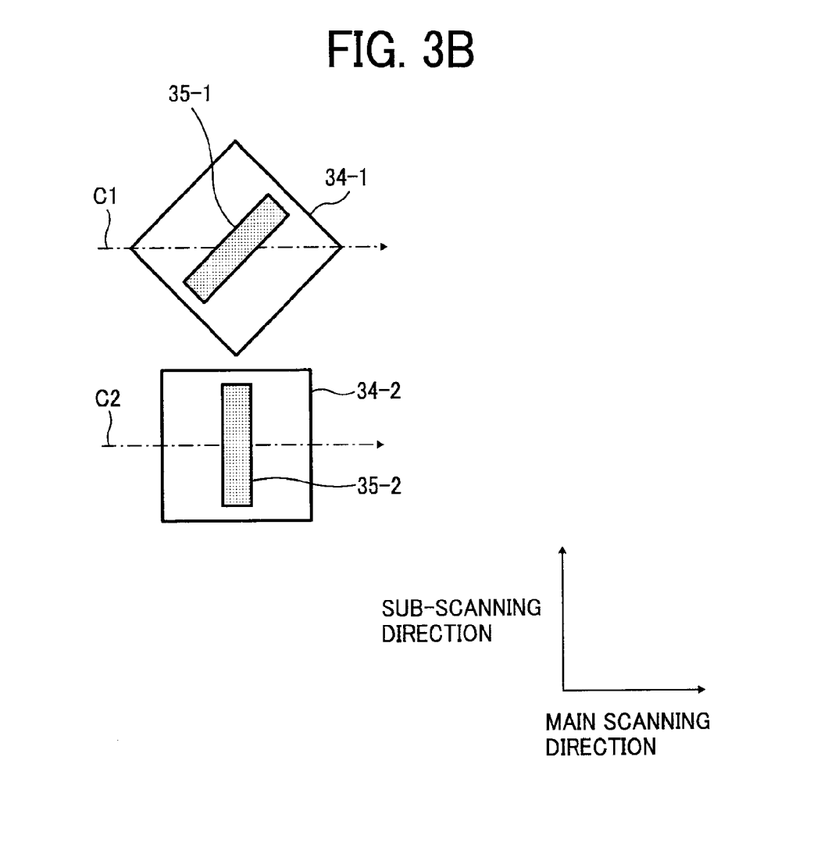

FIG. 3B is a schematic diagram for explaining an arrangement of the light detectors 34-1 and 34-2. The light detectors 34-1 and 34-2 are arranged apart from each other in the sub-scanning direction (vertical direction in FIG. 3B). The light detectors 34-1 and 34-2 respectively include light receiving units 35-1 and 35-2 that carry out photoelectric conversion of the light intensity of the light beams C1 and C2. Although the light detectors 34-1 and 34-2 are identical structurally, their orientation is different.

The light detector 34-2 performs synchronous detection using the light beam C2. The light detector 34-1 detects a position of the scan line in the sub-scanning direction using the light beam C1.

As shown in FIG. 3A, when an incident position of the laser beam entering the diffractive optical element 33 changes in the sub-scanning direction, the light beam C1 (minus-first-order diffracted light) diffracted by the diffractive optical element 33, a traversing position of the light beam C1 traversing the light receiving unit 35-1 of the light detector 34-1 changes in the sub-scanning direction (vertical direction in FIG. 3B). Because the light receiving unit 35-1 is tilted relative to the sub-scanning direction, a detection timing of the light beam C1 by the light receiving unit 35-1 changes according to the traversing position in the sub-scanning direction where the light beam C1 traverses the light receiving unit 35-1.

On the other hand, the light receiving unit 35-2 of the light detector 34-2 that performs synchronous detection by using the light beam C2 is parallel to the sub-scanning direction. As a result, the detection timing of the light beam C2 by the light receiving unit 35-2 does not change even if the traversing position of the light beam C2 in the sub-scanning direction changes. Thus, the position change of the laser beam in the sub-scanning direction can be detected by the difference in the detection timings by the light receiving units 35-1 and 35-2.

The diffractive optical element 33, which is used in the optical scanning device 50, is made of plastic whose linear expansion coefficient α is nearly equal to the rate of wavelength change β of the surface-emitting laser light source 20. Consequently, variation in the diffraction angle is suppressed to a negligible amount even if temperature variation occurs in the optical scanning device 50. Consequently, the position of the scan line in the sub-scanning direction can be precisely detected at all times.

Figure 4:
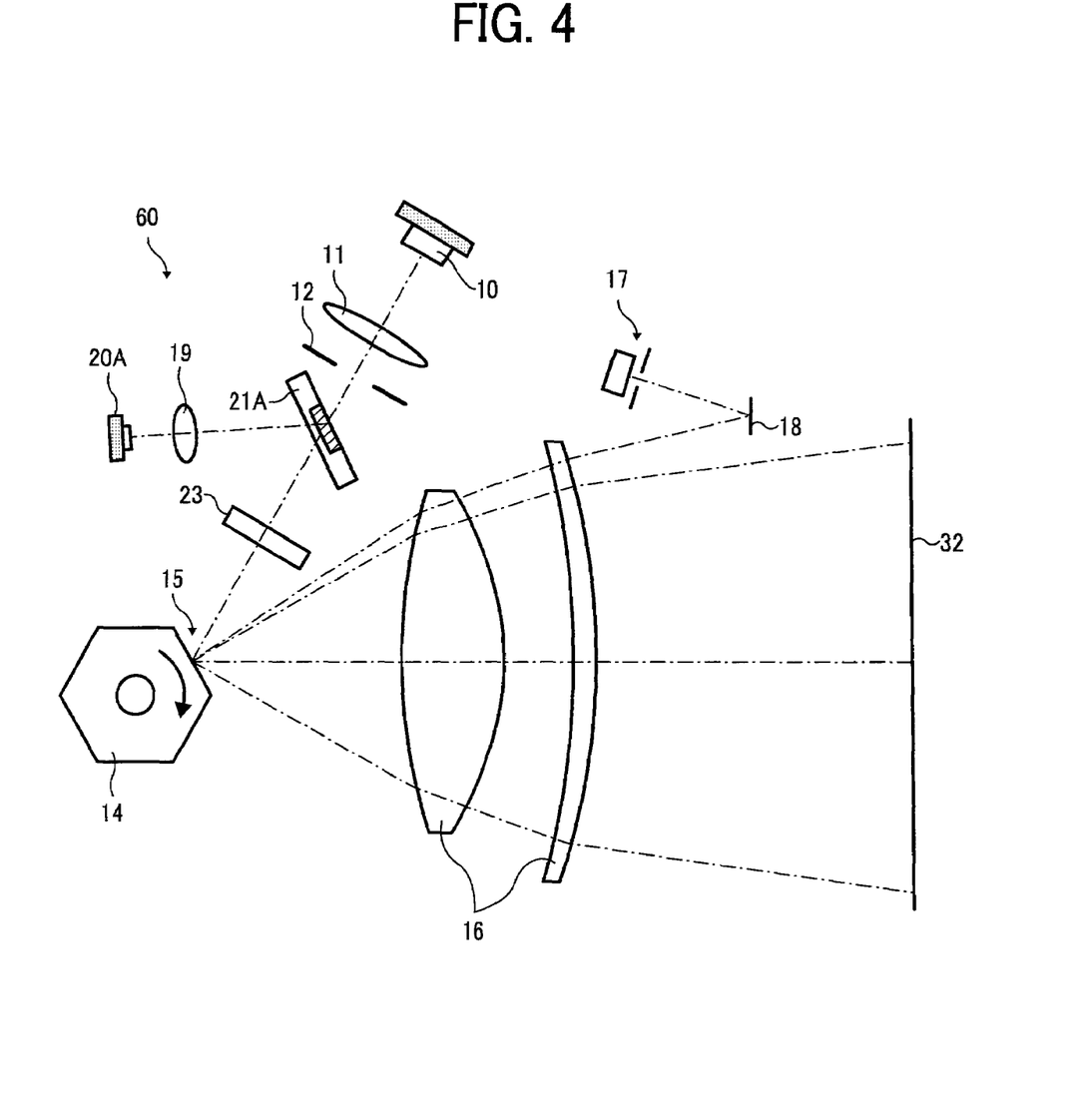
FIG. 4 is a schematic diagram of an optical scanning device according to another embodiment of the present invention.

FIG. 4 is a top view of an optical scanning device 60 according to another embodiment of the present invention. The optical scanning device 60 includes a surface-emitting laser light source 10, a coupling lens 11, an aperture member 12, a cylindrical lens 13, a light deflector 14, a scan-imaging optical system 16 formed of two lenses, a light-detector for synchronous-detection 17, a reflecting mirror 18, a light-guiding optical system 19, a light-detector for diffracted-light detection 20A, a diffractive optical element 21A, and a processor (not shown).

The coupling lens 11 converts a divergent laser beam that is emitted from the surface-emitting laser light source 10 into a convergent light beam, a divergent light beam, or a parallel light beam, as desired. It is supposed in this explanation that laser beam is converted into a substantially parallel beam by the coupling lens 11.

The laser beam that is converted to a substantially parallel light beam by the coupling lens 11 passes through the aperture member 12, where the peripheral portion of the light beam is blocked, and the laser beam emerging from the aperture member 12 is converged by the cylindrical lens 13 in the vicinity of a reflective surface 15 of the light deflector (polygon mirror) 14 as an elongated line image in the main scanning direction. The laser beam is deflected at a constant angular velocity by the rotating light deflector 14. The scan-imaging optical system 16 that includes two lenses forms a beam spot on the scanning surface 32 The beam spot optically scans the scanning surface 32 as the rotating light deflector 14 rotates.

The deflected laser beam is reflected by the reflecting mirror 18 and is guided to the light-detector for synchronous-detection 17 located outside an effective image area in the main scanning direction.

The diffractive optical element 21A that splits the laser beam is located in the light path between the coupling lens 11 and the light deflector 14, and diffracts a part of the incident laser beam. The zero-order transmitted light not diffracted by the diffractive optical element 21A enters the cylindrical lens 13 and the minus-first-order diffracted light is guided to the light-detector for diffracted-light detection 20A by the light-guiding optical system 19 for detection of light intensity. The light-guiding optical system 19 can be done away with.

In the optical scanning device 60, the diffractive optical element 21A is closer to the light deflector 14 than the coupling lens 11 is. This layout enables the diffractive optical element 21A to be mounted easily.

Also, the diffractive optical element 21A is closer to the light deflector 14 than the aperture member 12 is. Due to this layout, the size of the laser beam passing through the aperture member 12 does not change even if the dispersion angle of the emitted laser beam varies significantly due to variation in a driving current of the surface-emitting laser light source 10. As a result, variations in the dispersion angle will not have significant effect on detection of diffracted light.

The diffractive optical element 21A includes the surface-relief-type diffraction grating formed on one side of a parallel plate and which is made of plastic whose linear expansion coefficient α is substantially equal to the rate of wavelength change β of the surface-emitting laser light source 10. The shape and the size of the diffraction grating can be suitably designed so that a large portion of the laser beam entering the diffraction grating passed through it as the zero-order transmitted light, and a portion is diffracted is split off at a predetermined angle relative to the zero-order transmitted light as the minus-first-order diffracted light.

The minus-first-order diffracted light is guided to the light-detector for diffracted-light detection 20A for detection of the light intensity and an optical output of the surface-emitting laser light source 10. Based on the detection of the optical output, the driving voltage of a light-source driving unit is feedback-controlled (automatic power control (APC)) in real time such that the detection signals of the light-detector for diffracted-light detection 20A are unvarying. As a result, the optical output of the surface-emitting laser light source 10 can be stabilized.

Thus, by using a combination of the surface-emitting laser light source 10 and the diffractive optical element 21A made of plastic, the change in the diffraction angle of the minus-first-order diffracted light diffracted by the diffractive optical element 21A is suppressed to a negligible amount even if temperature variation occurs in the optical scanning device 60 and the minus-first-order diffracted light can be properly guided to the light-detector for diffracted-light detection 20A.

Figure 5:
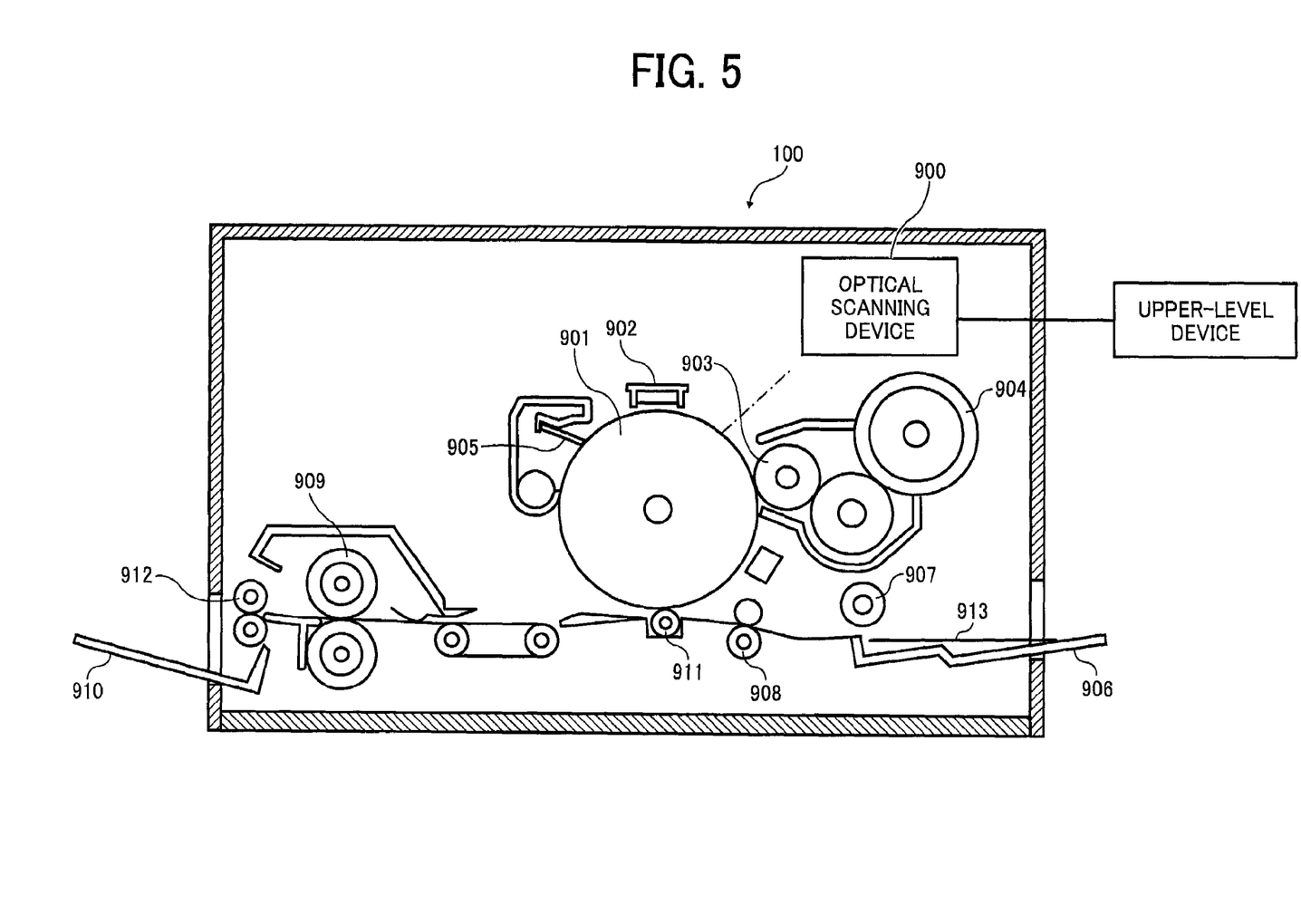
FIG. 5 is a schematic diagram for explaining an image forming apparatus according to still another embodiment of the present invention.

FIG. 5 is a schematic diagram of a laser printer 100 that is an image forming apparatus according to still another embodiment of the present invention. The laser printer 100 includes an optical scanning device 900, a photosensitive drum 901, a charger 902, a developing roller 903, a toner cartridge 904, a cleaning blade 905, a sheet feeding tray 906, a sheet feeding roller 907, a pair of registration rollers 908, a transfer roller 911, a fixing roller 909, a sheet discharging roller 912, and a sheet discharge tray 910.

The charger 902, the developing roller 903, the transfer roller 911, and the cleaning blade 905 of a cleaning device are respectively arranged either in close proximity to or touching the photosensitive drum 901. The charger 902, the developing roller 903, the transfer roller 911, and the cleaning blade 905 of the cleaning unit are sequentially arranged in a rotation direction (in the direction of the arrow in FIG. 5) of the photosensitive drum 901.

The photosensitive drum 901 has photoconductive properties.

The charger 902 uniformly charges the surface of the photosensitive drum 901 rotating clockwise at a constant speed. The optical scanning device 900 performs optical scanning of the charged surface of the photosensitive drum 901 and forms thereon an electrostatic line image. The optical scanning device 900 performs optical scanning and image writing by modulating the laser beam in accordance with an image data from a higher-level device such as a computer.

As the photosensitive drum 901 rotates, the electrostatic line image moves to a developing unit, where the developing roller 903 develops and converts the image into a visible image. A toner stored in the toner cartridge 904 is fed to the developing roller 903. The quantity of toner in the toner cartridge 904 is checked when power is turned on and when printing is finished. If the residual toner quantity is less, a message urging that the toner cartridge be replaced is displayed on a (not shown) display unit.

The visible image, which is a toner image, is transferred and fixed onto a recording sheet that serves as a recording medium. Recording sheets 913 are stored in the sheet feeding tray 906 and are one by one fed from the sheet feeding tray 906 by the sheet feeding roller 907. The pair of registration rollers 908 holds the leading edge of the recording sheet 913, and times the conveying of the recording sheet 913 to a contact portion of the photosensitive drum 901 to coincide with the movement of the toner image.

Transfer voltage is applied on the transfer roller 911 to electrostatically transfer the toner image from the surface of the photosensitive drum 901 to the recording sheet 913. After the toner image transferred to the recording sheet 913 is fixed by the fixing roller 909, the recording sheet 913 is discharged to the sheet discharge tray 910 by the sheet discharging roller 912 and stacked in the sheet discharge tray 910.

The residual toner on the surface of the photosensitive drum 901 after the toner image is transferred is removed by the cleaning blade 905, and the recovered toner is reused by a (not shown) toner recycling mechanism.

The optical scanning device 900 according to the embodiments that are explained with reference to FIGS. 2 to 4 uses the diffractive optical element 21A, the surface-emitting laser light source 10 as the light source, and the diffractive optical element 21A made of plastic whose linear expansion coefficient $\alpha$ nearly equal to the rate of wavelength change $\beta$ of the surface-emitting laser light source.

According to an aspect of the present invention, a diffraction angle of a diffractive optical element deployed in the optical scanning device virtually remains unaffected by the temperature variation that occurs within a temperature range of the optical scanning device. As a result, optical functions of the diffractive optical element can be properly maintained and optical scanning can be carried out, irrespective of the temperature variation, and an image forming apparatus with a good image forming capability is realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a laser light source that emits a laser beam;
   a light deflector that deflects the laser beam;
   a scan-imaging optical system that focuses the laser beam deflected from the light deflector on a scanning surface to optically scan the scanning surface;
   a diffractive optical element receives the laser beam and diffracts a portion of the laser beam as a diffracted light; and
   a detecting unit that detects the diffracted light, wherein
   the laser light source is a surface-emitting laser light source,
   the diffractive optical element is made of plastic material having a linear expansion coefficient within a temperature variation range of the optical scanning device nearly equal to a rate of wavelength change of an emission wavelength of the laser light source within the temperature variation range.

2. The optical scanning device according to claim 1, wherein the diffractive optical element includes a parallel plate-like plastic substrate and a surface-relief-type diffraction grating arranged on the parallel plate-like plastic substrate.

3. The optical scanning device according to claim 1, wherein the diffracted light is a first-order diffracted light.

4. The optical scanning device according to claim 1, wherein the diffractive optical element receives the laser beam in an area that is outside of an effective scanning area on an optical scanning start side, splits the laser beam into two light beams of a zero-order transmitted light and a minus-first-order diffracted light, and
   the detecting unit includes a synchronous detector that performs synchronous detection of optical scanning start based on one of the zero-order transmitted light and the minus-first-order diffracted light.

5. The optical scanning device according to claim 4, wherein the detecting unit includes a position detector that detects a position of a scan line in a sub-scanning direction based on other of the zero-order transmitted light and the minus-first-order diffracted light.

6. The optical scanning device according to claim 1, wherein
   the diffractive optical element is arranged between the laser light source and the light deflector, receives the laser beam emitted by the laser light source, splits the laser beam into two light beams of a zero-order transmitted light and a minus-first-order diffracted light, and
   the detecting unit detects an optical output of the laser light source based on the minus-first-order diffracted light.

7. A method of optical scanning comprising:
   providing an optical scanning device including
      a laser light source that emits a laser beam;
      a light deflector that deflects the laser beam;
      a scan-imaging optical system that focuses the laser beam deflected from the light deflector on a scanning surface to optically scan the scanning surface;
      a diffractive optical element receives the laser beam and diffracts a portion of the laser beam as a diffracted light; and
      a detecting unit that detects the diffracted light, wherein
      the laser light source is a surface-emitting laser light source,
      the diffractive optical element is made of plastic material having a linear expansion coefficient within a temperature variation range of the optical scanning device nearly equal to a rate of wavelength change of an emission wavelength of the laser light source within the temperature variation range; and
   optically scanning the scanning surface by using the optical scanning device such that a diffraction angle of a diffracted light that is detected by a light-detector for diffracted-light detection is not actually changed within a temperature variation range of the optical scanning device.

8. An image forming apparatus comprising an optical scanning device, the optical scanning device including a laser light source that emits a laser beam;
a light deflector that deflects the laser beam;
a scan-imaging optical system that focuses the laser beam deflected from the light deflector on a scanning surface to optically scan the scanning surface;
a diffractive optical element receives the laser beam and diffracts a portion of the laser beam as a diffracted light; and
a detecting unit that detects the diffracted light, wherein
the laser light source is a surface-emitting laser light source,
the diffractive optical element is made of plastic material having a linear expansion coefficient within a temperature variation range of the optical scanning device nearly equal to a rate of wavelength change of an emission wavelength of the laser light source within the temperature variation range.

* * * * *